No. 640,179. Patented Jan. 2, 1900.
J. A. DALY.
PROCESS OF LINING VULCANIZABLE PLATES.
(Application filed Apr. 20, 1898.)
(No Model.)
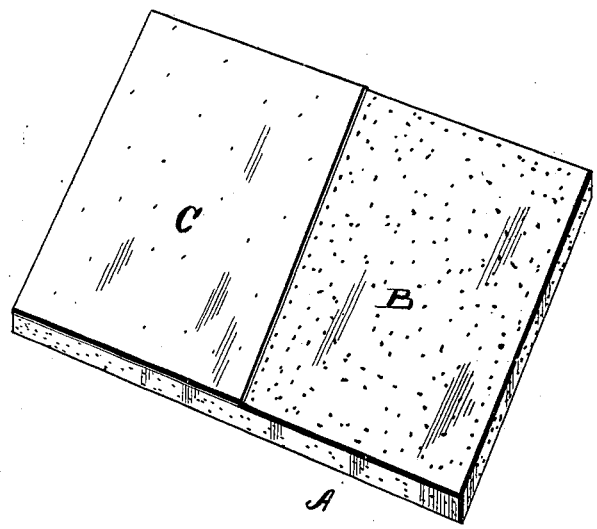
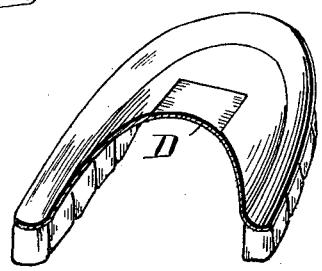
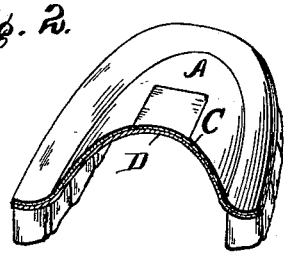
WITNESSES
Chas. H. Davies.
Robt. H. Payne.
INVENTOR
John A. Daly
By H. A. Bartlett
Attorney

UNITED STATES PATENT OFFICE.

JOHN A. DALY, OF WASHINGTON, DISTRICT OF COLUMBIA.

PROCESS OF LINING VULCANIZABLE PLATES.

SPECIFICATION forming part of Letters Patent No. 640,179, dated January 2, 1900.

Application filed April 20, 1898. Serial No. 678,266. (No specimens.)

*To all whom it may concern:*

Be it known that I, JOHN A. DALY, residing at Washington, District of Columbia, have invented certain new and useful Improvements in Processes of Lining Vulcanizable Plates, such as Dental Plates, of which the following is a specification, reference being had therein to the accompanying drawings.

This invention relates to a method of and material for lining vulcanizable plates for dental and similar purposes.

In my Patent No. 390,950, of October 9, 1888, I describe and claim a metallic foil having one burnished surface and one spongy surface uniform over the entire sheet. The process of electrodeposition by which the spongy surface is produced is described in said patent. In my Patent No. 390,654, of October 9, 1888, I describe and claim a process of applying such a foil to a dental plate. The foil I have generally used is a gold-foil.

The present invention is an improvement on my former process and material.

Figure 1 represents a sheet of foil greatly magnified as to thickness with one portion of the spongy surface further prepared. Fig. 2 represents a section of a lined dental plate, and Fig. 3 a section of an unlined plate with a cement coating.

The sheet of foil having a burnished surface A and a spongy surface B, as described in the patent aforesaid, is preferably further prepared for use by painting or saturating the spongy surface with a rubber or gutta-percha cement, as at C. This cement is applied in a rather thin solution and will dry and become absorbed by the spongy foil and fill the pores thereof. The cement used may be one of many known rubber or gutta-percha cements, such as rubber dissolved in chloroform, benzin, or other liquid solvent. When the cement has been applied and dries, it is better that only a very thin surface covering shall appear on the foil, as it is desirable to vulcanize this applied cement quickly when the work is in the vulcanizer. The cement can be applied to the spongy foil, however, and the same dried and stored away indefinitely ready for use.

By my patented process the lining could be applied to a dental plate in the process of making; but by the present improvement the lining may be applied to an old plate, as well as to a new one.

Let D represent a rubber or gutta-percha dental plate supposed to be wholly or partly vulcanized. To the surface of this plate which is to be lined with the prepared foil I apply a thin coating of the rubber cement. This should be permitted to dry until it is just sticky or "tacky." Then the spongy side of a sheet of foil is applied to the plate and the foil pressed down with the fingers or with a brush or tool until the foil assumes the exact form of the surface of the plate, conforming to all the sinuosities thereof. This the foil will do, because it is very thin and pliable and because the sticky surface of the plate adheres very quickly to the spongy foil and attaches it quite firmly to the plate. The plate, with the foil so attached, is placed in a vulcanizer and heated to vulcanizing temperature. As the plate proper has been wholly or partly vulcanized, it is generally only necessary to retain the plate, with its lining, in the vulcanizer long enough to vulcanize the cement coating or filling which is contained in the spongy substance of the foil and the thin coating applied to the dental plate. Vulcanization for a few minutes is generally sufficient to unite the cement and the plate into a homogeneous mass, the vulcanized material in the foil being united to that of the plate by the vulcanization and producing a plate with which the lining is so united that it cannot be removed without destruction of the plate or lining.

Inasmuch as the present invention permits me to make a perfect metallic lining for an old set of teeth (heretofore considered impracticable) and is much easier to work and more certain in results than my patented method, I consider it a marked improvement.

The spongy foil can be attached to the dental plate with considerable firmness by a pure-rubber or similar cement without vulcanization; but a much firmer attachment is made by vulcanizing a vulcanizable cement between the foil and plate.

In my Patent No. 390,654, before referred to, I state as follows: "This electrodeposit is continued until it becomes sufficiently rough and porous to form a mechanical union with the vulcanite when applied to it and may be made either after accurately adapting the foil to the plaster model and then depositing on it or first making the deposit on the sheet of foil and afterward cutting and fitting the lining to the plaster model or directly to the rubber after it is molded and before vulcanizing. In the former case it is necessary to use well-known methods to protect the plaster model from the action of the chemicals in the gold solution and to prevent the gold from getting between the foil and the model. In the latter case the pieces of lining as they are put on must be made to adhere to the model or to the molded rubber by proper varnishes or solutions. In the former case the rubber is packed and vulcanized by the usual methods after the lining is fitted to the model and prepared. In the latter the rubber is packed before and vulcanized after the prepared lining is properly fitted."

It is evident and it is a fact that the "proper varnishes or solutions" referred to in said patent were for the purpose of securing temporary adhesion and that the permanent adhesion of the spongy foil was secured by the entrance of rubber from the body of the dental plate, which rubber was melted and compressed into the spongy foil by the heat and pressure of vulcanization, such heat being usually above 200° Fahrenheit and the pressure often as high as one hundred or two hundred pounds per square inch. By such process it was not possible to line with my foil a plate which had been already vulcanized, nor do I believe it was ever possible to permanently attach a metallic foil to a body of rubber after vulcanization until my present improvement was applied by me. By the practice of my present invention I am able to improve the fit of a dental plate long in use. As is well known to dentists, the model on which a dental plate is made shrinks or changes somewhat in vulcanization. The fit of a dental plate is seldom exact. The shape of the mouth varies somewhat by absorption of the processes and tissues, so that an old vulcanized dental plate, likely to be a little loose at first, becomes considerably loose with lapse of time. Such a plate can be made to again fit the mouth by the addition of a gold or other metallic lining according to my present invention. As according to my former invention and patents the foil was invariably applied to the rubber or the rubber to the foil before vulcanization of the rubber, no advantage by the thickening of the plate after its form was fixed by vulcanization was attainable by my then inventions.

I believe I am the first to permanently secure a metallic lining to a previously-vulcanized dental plate, and I desire to claim, broadly, the method by which such result is reached.

I am aware that a compound plate composed of gold and a baser metal has heretofore been vulcanized onto an unvulcanized dental plate; but such method of lining has not been largely used for the reason, as I believe, that the sulfurous and other chemical agents developed in the process of vulcanization attack and destroy the base metal, leaving the whole imperfect. These chemical elements, as I have found, will attack almost any known pure metal except pure gold, (and possibly platinum.) By my method I can line an already-vulcanized dental plate with a lining consisting of a compound of foil and a baser metal or an alloyed foil, giving tolerable results, for while the gases or other chemical agents developed in the vulcanization will attack such elements, as before, the amount of vulcanizable material introduced under my present process is not great enough to develop corrodent chemical material sufficient in amount to destroy much of the metal, and the action may be merely to make such a metal more spongy and therefore more adherent to the plate to which it is united by the vulcanization of the intervening film of vulcanizable cement.

I claim—

1. The method of lining vulcanized dental plates with metallic foil having a spongy face, which consists in filling the spongy stratum of the foil with a vulcanizable cement, then temporarily attaching this filled face of the foil to a dental plate and vulcanizing the two together.

2. The method of attaching spongy foil to a vulcanized plate, which consists in filling the porous foil with an unvulcanized solution, and vulcanizing the same on the previously-vulcanized plate.

3. As an article of manufacture, a sheet of metallic foil having a spongy stratum filled with an unvulcanized but vulcanizable cement, substantially as described.

4. As an article of manufacture, a metallic foil having a burnished face and a spongy stratum filled with an unvulcanized but vulcanizable compound, and a surface covering to this spongy stratum consisting of a vulcanizable compound.

5. The method of lining a previously-vulcanized dental plate, which consists in covering the spongy face of a metallic foil having one spongy face with a vulcanizable solution, placing this prepared face in contact with the vulcanized plate, and vulcanizing the foil to the plate, substantially as described.

In testimony whereof I affix my signature in presence of two witnesses.

JOHN A. DALY.

Witnesses:
W. A. BARTLETT,
WALLACE MURDOCK.